Nov. 13, 1956  R. J. PETERSON  2,770,324
SELF-LEVELING LIFT

Filed July 21, 1952  2 Sheets-Sheet 1

INVENTOR
ROBERT J. PETERSON
BY Williamson, Williamson
Schroeder & Adams ATTORNEYS Nov. 13, 1956  R. J. PETERSON  2,770,324
SELF-LEVELING LIFT
Filed July 21, 1952  2 Sheets-Sheet 2
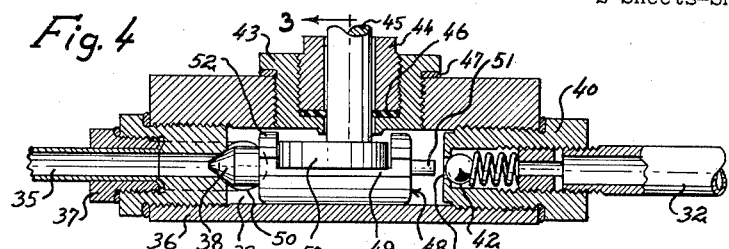
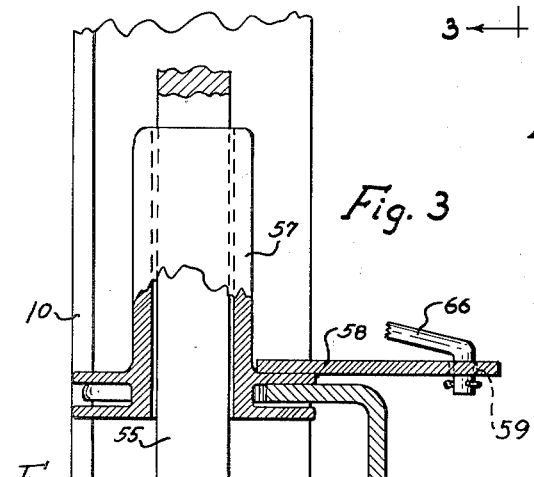
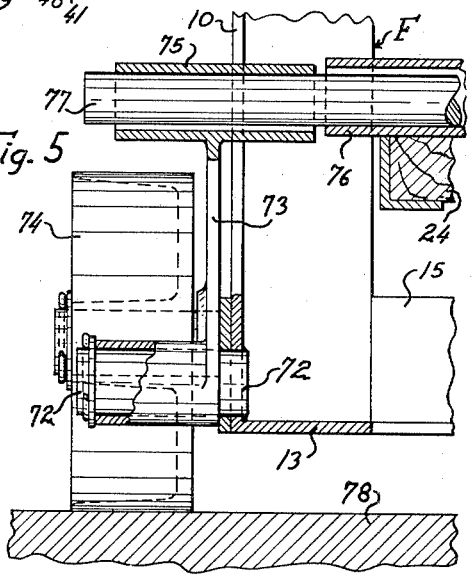
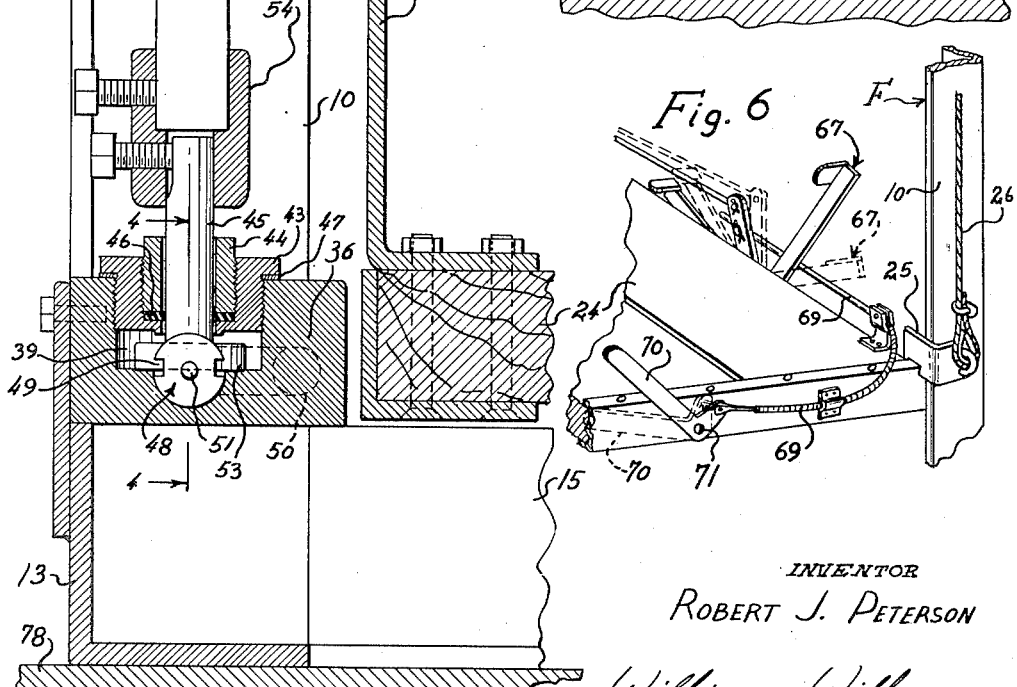
INVENTOR
ROBERT J. PETERSON
BY Williamson, Williamson
Schroeder & Adams ATTORNEYS

United States Patent Office 2,770,324
Patented Nov. 13, 1956

2,770,324

SELF-LEVELING LIFT

Robert J. Peterson, Warren, Minn.

Application July 21, 1952, Serial No. 299,989

1 Claim. (Cl. 187—34)

This invention relates to portable lifts. More particularly, it relates to a lift of the type adapted to elevate a load from one level to another desired level so that the load may be transferred to and from a vehicle with a minimum of effort and inconvenience.

Various devices have been devised for the facilitation of the loading and unloading of vehicles, but to my knowledge none of these devices has fulfilled the need for automatic adjustment to the varying heights of the loading floor of the vehicle as the weight of the load upon the vehicle increases or decreases. As a truck, for example, is loaded or unloaded, the elevation of the floor of the truck body varies in accordance with the extent of flexing of the springs of the truck which in turn is determined by the extent of the load upon the floor of the truck. As a result, the lift device must be adjusted for each addition or subtraction to the load to compensate for the change in elevation, and if this is to be done manually, it involves the expenditure and wastage of considerable time and effort. My invention is directed toward the elimination of these disadvantages.

It is a general object of my invention to provide a novel and improved portable lift of cheap and simple construction and operation.

A more specific object is to provide a portable lift which will greatly facilitate the loading and unloading of heavy materials upon trucks and the like and thereby effect a substantial saving in time and effort.

A still more specific object is to provide a novel and improved portable lift which may be manufactured at low cost and which will automatically determine the proper level at which it should cease its upward movement so as to be positioned at a convenient level for loading and unloading of a truck or the like.

Another object is to provide a portable lift constructed to permit a load to be run upon its platform and elevated thereby and to automatically be brought to rest at an optimum loading or unloading level relative to the level of the truck floor regardless of the load upon the truck.

Another object is to provide a portable lift constructed to compensate for the changing elevation of a truck floor body during the loading and unloading operations caused by the change in weight upon such floor.

Another object is to provide a lift having novel and improved means for making the same portable with a minimum of effort and inconvenience.

These and other objects and advantages of my invention will more fully appear from the following description made in connection with the accompanying drawings, wherein like reference characters refer to the same or similar parts throughout the several views, and in which:

Fig. 3 is a fragmentary vertical sectional view on an enlarged scale taken along approximately line 3—3 of Fig. 4 of the controlling valve showing its actuating rod and the connection of the latter to the controlling linkage;

Fig. 4 is a fragmentary vertical sectional view taken along approximately line 4—4 of Fig. 3;

Fig. 5 is a fragmentary vertical sectional view showing in detail one of the supporting wheels and its mounting; and Fig. 6 is a front end partial perspective view of the embodiment shown in Figs. 1 and 2 showing in detail the trip element and its connection to the controlling linkage.

Figure 1:
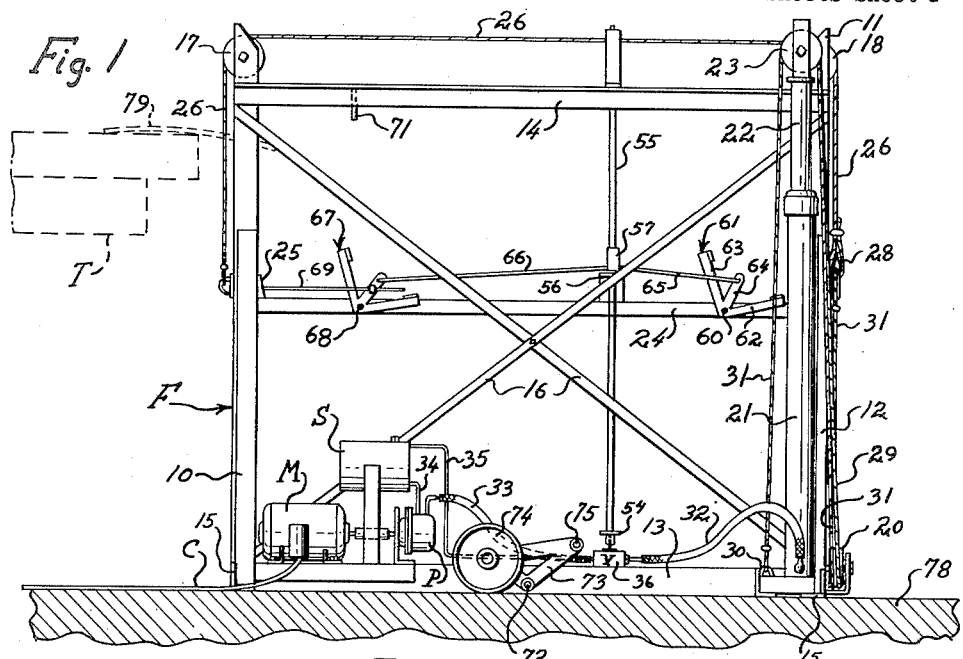
Fig. 1 is a side elevational view of one embodiment of my invention.

One embodiment of my invention may include, as shown in Figs. 1–6, a frame indicated generally as F and being of generally channel shape taken transversely of its length. As shown, this frame F is constructed almost entirely of angle iron to provide maximum in rigidity and strength. At its front end and on each side there is an upright support leg 10 and at its rear end and on each side there is an upright support leg 11. Each of these support legs 10 and 11 is provided with diagonally extending brace structure 12. Extending between the lower ends of the support legs 10 and 11 and longitudinally of the frame F is a side piece 13. Extending between the upper ends of these legs is a similar side piece 14. Extending transversely of the frame between the lower ends of the support legs 10 and 11 at each of the ends of the frame is a cross bar 15. A pair of cross straps 16 extend diagonally and at right angles to each other to the opposite corners of the frame at each side thereof.

Rotatably mounted at the top of each of the support legs 10 at the front of the frame F is a single trackway sheave 17, the axis of the sheave extending transversely of the frame. Mounted at the top of each of the support legs 11 at the rear of the frame F is a double trackway sheave 18, the axis of these sheaves also extending transversely of the length of the frame. A single trackway sheave 19 is rotatably mounted adjacent the foot of one of the support legs 11 at the rear of the frame F, the axis of this sheave 19 extending lengthwise of the length of the frame F. Adjacent the base of the other support leg 11 at the rear of the frame F is a double trackway sheave 20 with its axis extending lengthwise of the frame.

Mounted on the frame F adjacent the double trackway sheave 20 is an upright hydraulic cylinder 21 having a vertically extensible piston 22 which carries a double trackway sheave 23 at its upper end, the axis of the sheave 23 extending transversely of the frame F.

Mounted within the frame F for vertical movement relative thereto, is a rigid platform 24. This platform is provided with an outwardly extending guide member 25 at each of its corners to engage its respective support leg 10 or 11 to guide the platform in its vertical movement within the frame.

Figure 2:
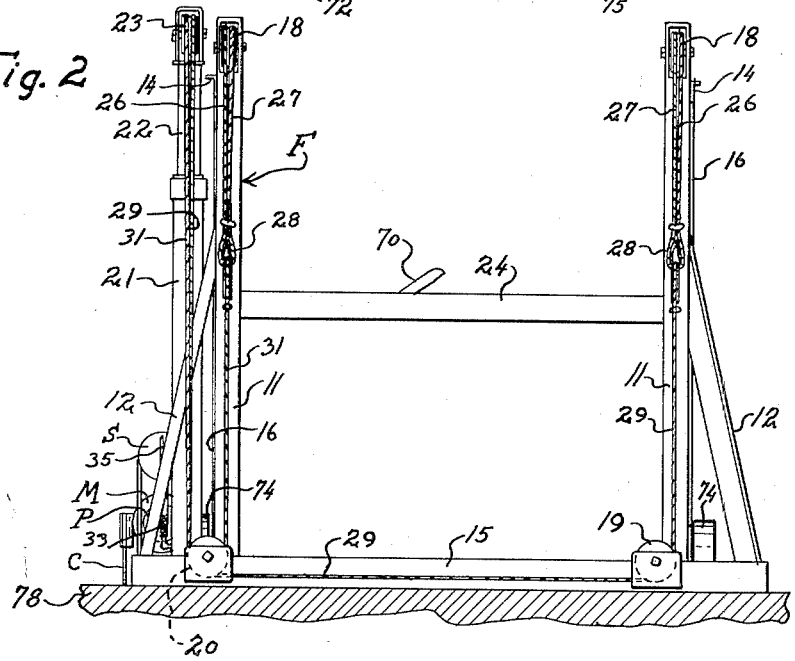
Fig. 2 is a rear end elevational view of the same.

Connected to each of the forward corners of the platform 24 and extending upwardly over its respective sheave 17 is a single cable 26. This cable 26 extends rearwardly parallel to the length of the frame F and over its respective sheave 18 at the rear of the frame. A second cable 27 is connected to the free end of the cable 26 and extends forwardly back over the double sheave 18 and has its other end connected to the respective rear corner of the platform 24. In this manner, the forward and rearward end at each side of the platform 24 is connected by a cable which passes over the double sheave 18, these cables being connected rearwardly of the sheave 18, to form a loop 28. One of these loops 28 has a third cable 29 connected thereto which extends downwardly around the sheave 19 and transversely of the frame F to the other sheave 20 around which it is entrained and then extends upwardly over the sheave 23 at the upper end of the piston 22 and is anchored at 30 at the base of the cylinder. The other loop 28 has a fourth cable 31 which extends downwardly around the sheave 20, as best shown in Fig. 2, and then upwardly over and around the sheave 23 at the top of the piston 22 and then downwardly again to the point 30 where it is anchored at the base of the cylinder 21. In this manner, each of the cables 26 and 27 secured to the respective sides of the frame F is drawn downwardly and rearwardly of the sheaves 18 when the piston 22 is extended upwardly and thus the platform will be raised accordingly.

The cylinder 21 is connected to a source of hydraulic fluid by a conduit 32, the other end of this conduit being connected to a valve indicated generally as V and to be hereinafter described in greater detail. The valve V is connected by a second conduit 33 to a gear pump P which is driven continuously by an electric motor M, the source of electricity being provided through an electric cable C. The pump P is connected by a conduit 34 to a supply tank S which contains the hydraulic fluid. The supply tank S is also connected by a conduit 35 to the valve V as best shown in Fig. 1. The pump P provides the necessary fluid under pressure to operate the cylinder 21 and the valve V regulates or controls the flow of this fluid to and from the cylinder.

The valve V, as best shown in Figs. 3 and 4, consists of a valve block 36 having a threaded opening adapted to receive an externally threaded plug 37 which is connected to the conduit 35 leading from the supply tank. This plug 37 has a valve seat 38 formed at its inner end. The plug 36 also has an opening connected with the conduit 33 which leads from the pump P, this opening connecting at all times with the open interior 39 of the valve block. At the other end of the valve block 36 is a third opening within which is received an externally threaded plug 40 which is connected to the conduit 32 leading to the cylinder 21. This plug 40 has a valve seat 41 adapted to cooperate with a spring loaded check valve 42. Formed in the top portion of the block 36 is a fourth opening adapted to receive an externally threaded sleeve 43 which in turn receives an externally threaded plug 44. An actuating rod 45 extends downwardly through the plug 44, the seal being perfected by a neoprene washer 46 and a copper washer 47.

Mounted within the valve block 36 in free sliding relation longitudinally of the block is the movable element 48 of the valve. This element 48 is a metal block having a longitudinal groove 49 formed in one of its sides and extending longitudinally of the element. At one of its ends is a tapered pin 50 and at its other end is a second but blunt-ended pin 51. The pin 50 is tapered to adapt it to cooperate with the seat 38 and the pin 51 is positioned to engage the ball of the check valve 42. A channel 52 is formed in the upper part of the movable element 48, this channel extending transversely of the length of the element, and within this channel is positioned a cam 53, the cam being mounted eccentrically on the lower end of the actuating rod 45 so that when the rod is rotated about its longitudinal axis the cam 53 will cause the movable element 48 to move longitudinally within the opening 39 of the valve block 36. Thus it can be readily seen that the position of the movable element 48 relative to the valve seat 38 and the check valve 42 can be regulated at will.

As best seen in Fig. 3, the actuating rod 45 is connected by a linking collar 54 to a rod 55 which is rectangular in cross-section. This rod 55 extends uprightly and is mounted for rotation about its longitudinal axis in a bracket 56 which is carried by the platform 24. A second collar 57 is carried by the rod 55 above the bracket 56, the opening in this collar being complementary in shape to the cross-sectional shape of the rod 55 so as to rotate therewith. The collar 57 has an outwardly extending horizontal flange 58 provided with openings such as 59 adjacent its peripheral area to connect the same with the rest of the linkage to be hereinafter described.

Pivotally mounted as at 60 upon the platform 24, as best shown in Fig. 1, is an adjusting foot lever 61. This foot lever is comprised of a pair of individual levers 62 and 63 which extend at right angles to each other, and a connecting lever 64 extends outwardly between the two to serve as a connecting means with a rod 65 to connect the entire lever 61 with the flange 58. A rod 66 similar to the rod 65 connects a similar foot lever indicated generally as 67 and pivoted as at 68 upon the forward portion of the platform 24 to the flange 58. In this manner the rotation of the rod 55 about its longitudinal axis may be controlled by the operator with his foot so as to govern the position of the cam 53 and hence the movable element 48 in the valve V.

Connected to the foot lever 67, as best shown in Fig. 6, by a flexible cable 69, is a lever member 70 which is pivotally mounted as at 71 upon the forward end of the platform 24. This lever 70 acts as a trip element and extends away from the platform 24 so as to engage the rear end of the truck body during the upward movement of the platform 24. As shown, this trip element 70 extends upwardly and is swingable to the dotted line position shown when it is engaged and depressed. The cable 69 is of such length that when the trip element 70 is depressed to the same level as the upper surface of the platform 24, the foot lever 67 will be rotated forwardly to a position such that the cam 53 moves the movable element 48 to a neutral position.

The flexible cable 69, the foot lever 67, the connecting rod 66, the collar 57 with its flange 58, and the rod 55, may all be considered to constitute linkage mechanism between the trip element 70 and the valve V. Wherever hereinafter the term "linkage mechanism" is used it is intended to include these elements or their mechanical equivalents when used to connect the trip element 70 with the valve V so that the valve will be governed accordingly.

It should be noted that the movable element 48 of the valve V has three positions. The position shown in Fig. 4 is the position of this element when the hydraulic fluid is being introduced under pressure into the cylinder 21. The fluid which is constantly being pumped into the valve block 36 is then prevented by the pin 50 from passing into the conduit 35 by the pin cooperating with the seat 38. The pressure of the fluid is sufficient to drive the check valve 42 away from the seat 47 to permit the fluid to enter the cylinder 21. When the rod 55 is rotated by the movement of the trip element 70 to substantially horizontal position, the cam 53 will turn sufficiently to move the movable element 48 to a position where the pin 50 will be free of the seat 38 and the pin 51 will not move the check valve 42 away from the seat 47. This is known as neutral position and the fluid from the pump P will pass freely around through the conduit 35 and be returned to the supply tank S. If the lever 62 is depressed, the cam 53 will be brought around to cause the slidable element 48 and its pin 51 to press the check valve 42 away from its seat 47 and permit the fluid to return through the conduit 32, along the slot 49 and back into the conduit 35 to the supply tank S.

Mounted on one of the side pieces 14 and depending therefrom is a stop pin 71 which is positioned to engage the portion of the foot lever 67 which compares to the lever 63 of the foot lever 61 to cause the foot lever 67 to move the valve to neutral position. This stop element serves to arrest the upward movement of the platform when it approaches its upper limit.

Pivotally mounted on the outer side of each of the side pieces 13 as at 72 is a triangularly shaped mounting 73 which rotatably mounts at one of its corners a wheel 74. At its other free corner, the triangularly shaped mounting has a tubular element 75, this tubular element normally being at an elevation slightly above that of the platform 24 when the platform is in lowered position.

When it is desired to make the entire frame and platform mobile, I merely place a piece of pipe 76 between the tubular elements 75 and insert a smaller solid shaft 77 therethrough. By raising the platform the two tubular elements are drawn upwardly and the wheel 73 pivots downwardly about its pivot 72 so as to engage the surface of the floor 78 and raise the entire structure therefrom. Thus it is an easy matter to roll the entire device to any desired position with or without a load thereupon. When the structure is properly positioned, I lower the platform 24 whereupon the tubular elements 75 are permitted to swing downwardly and the wheels 74 swing upwardly and out of engagement with the floor 78.

In operation, my portable lift may be used in conjunction with a hand truck for loading and unloading trucks and the like or it may be used as a means for conveying material to the truck and then elevating the same to the desired level without employing any hand truck in conjunction therewith. In either event, the load is brought upon the platform 24 and then by merely pressing the lever 62 downwardly the rod 55 is caused to rotate about its longitudinal axis and shifts the movable element 48 of the valve V so as to close the inlet to the conduit 35 which leads back to the supply tank and thereby cause the fluid to enter the cylinder 21. This causes the piston 22 to be extended upwardly and draw the cables 31 and 29 downwardly and to the left around sheaves 19 and 20 as best shown in Fig. 2. This in turn causes the cables 26 and 27 to be drawn rearwardly over the sheaves 18 and to thereby draw the platform 24 upwardly. During this upward movement, the collar 57 slides freely relative to the shaft 55 so as to remain in its same position relative to the platform 24 regardless of the elevation of the platform. The platform will continue to move upwardly until such time as the trip element 70 is engaged by a gang plate 79 or similar device which will normally extend rearwardly from the rear end of the truck being loaded or unloaded to facilitate the running of a hand truck from the platform to the truck. This gang plate will normally be a metal plate which will function to serve the purpose of a common gang plank. In other words, the device used to move the load along a horizontal surface will be run across this plate to accomplish the transfer from the platform 24 to the floor of the truck or vice versa. The gang plate 79 will cause the trip element 70 to move to a substantially horizontal position and to substantially the same level as the upper surface of the platform 24. When the trip element is moved to this level the cable 69 will have moved the foot lever 67 so that the flange 58 will have rotated the collar 57 and the rod 55 sufficiently to move the valve to neutral position. As explained above, this will arrest the upward movement of the platform 24 and maintain it at that level since the check valve 42 will prevent the return of the fluid backwardly through the conduit 32. The operator can then move the load quickly and easily either from the truck onto the platform or from the platform to the truck as may be desired, and thereafter by simply causing the foot lever 67 to pivot forwardly, the valve may be moved to descending position so that the pin 51 will force the check valve 42 inwardly to permit the fluid to return through the conduit 32, through the valve and to the supply tank S. Thus the platform will slowly descend to the floor level. Thus it can be seen that it will be an easy matter to run a hand truck loaded with heavy sacks such as cement up a small incline onto the platform 24, to then elevate the platform until it is automatically arrested by the trip element 70 at the desired level whereupon the hand truck and its load may be run off the platform 24 and onto the frame of the truck. It can be readily seen that regardless of the elevation of the floor of the truck the platform will always stop at the proper and optimum level for passage of the hand truck from the platform to the floor of the truck. This is true regardless of the amount of load upon the truck and the consequent varied levels at which the floor of the truck may be positioned, since the determination of the level at which the platform 24 is arrested is at all times correlated with the elevation of the floor of the truck. For the sake of brevity, I have employed the term "self-leveling" herein as a means of referring to this automatic arresting feature and wherever hereinafter this term is used I am referring to this feature of my lift which assures that the platform will automatically have its upward movement terminated at the optimum level relative to the level of the body of the truck for loading and unloading operations.

One of the outstanding advantages of my invention is this self-leveling feature. It can be readily seen that through the use of a lift constructed in accordance with my invention, a substantial saving in time and effort may be accomplished. The operator needs merely to run his load onto the platform, kick the foot lever 67, permit the load to be elevated to the optimum level for transfer of the load to the floor of the truck, and then move the load onto the truck. He may then return to the platform 24, kick the foot lever 67 in the opposite direction and it will readily descend to the floor level for repeated operation. Each time he need not worry about any changes which may have taken place in the elevation of the floor of the truck because of increased weight having been added to the truck. Thus it can be seen that I have eliminated the need for manually leveling such a device for each individual load.

Another important advantage of my lift is the simple and efficient means provided for making the entire structure portable with or without a load thereupon. It should be noted that the entire lifting process is accomplished by the hydraulic means and that one need only to push the structure around after the entire device has been lifted clear of the floor.

It will, of course, be understood that various changes may be made in the form, details, arrangement and proportions of the various parts without departing from the scope of my invention.

What is claimed is:

A self-leveling lift comprising an upright upwardly facing channel-shaped frame, a single trackway sheave at each of the upper forward corners of said frame, a double trackway sheave at each of the upper rearward corners of said frame, each of said sheaves being mounted on an axis extending transversely of said frame, a single trackway sheave mounted on said frame on an axis extending longitudinally of the frame at one of the lower rear corners of said frame, a double trackway sheave mounted on said frame on an axis extending longitudinally of the frame at the other of its lower rear corners, an upright hydraulic cylinder mounted on said frame adjacent said last mentioned sheave, said cylinder being connected to a source of hydraulic fluid under pressure, a piston slidably mounted within said cylinder for upward and downward movement therewithin, a double trackway sheave mounted on the upper end of said piston, a cable connected to the forward corner of said platform on the side of the frame having the single trackway sheave at the rear corner and extending upwardly over said sheaves at the upper corners on that side of said frame and reversing itself backwardly over said double trackway sheave at the upper rear corner on that side and being connected to the rear corner of said platform on that side, said cable being connected to a second cable rearwardly of the double trackway sheave at the upper corner on that side, said second cable extending downwardly around said single sheave at the lower rear corner of said frame, then across said frame and around the double sheave at the other lower rear corner of said frame, and then upwardly over said double trackway sheave mounted on the upper end of said piston and then downwardly to a position adjacent the foot of said piston where it is anchored; a third cable connected to the other forward corner of said platform and extending upwardly over the sheave on that side of the frame at its upper forward corner, then rearwardly over the double trackway sheave at the upper rear corner on that side of the frame, then reversing itself backwardly over the same double trackway sheave and downwardly to the rear corner of said platform on that side to which it is secured, a fourth cable connected to said third cable rearwardly of the double trackway sheave at the upper rear corner on that side of said frame and extending downwardly around said double trackway sheave at said lower rear corner of said frame, then upwardly around said sheave mounted on the upper end of said piston, then downwardly to a point adjacent the base of said cylinder where it is anchored; a pivotable trip element carried by said platform and extending upwardly therefrom, a valve element controlling the flow of the hydraulic fluid to said cylinder from its source, and linkage mechanism connecting said trip element to said valve element, said trip element being adapted when pivoted to actuate said linkage mechanism and said linkage mechanism being adapted to in turn control said valve element when so actuated to cause the latter to control the flow of the hydraulic fluid to arrest the vertical movement of said platform.

References Cited in the file of this patent

UNITED STATES PATENTS

| | | |
|---|---|---|
| 508,510 | Eaton | Nov. 14, 1893 |
| 929,870 | Newton | Aug. 3, 1909 |
| 956,205 | Slavin | Apr. 26, 1910 |
| 959,786 | Neal | May 31, 1910 |
| 991,137 | Chesnutt | May 2, 1911 |
| 1,268,109 | Furlow | June 4, 1918 |
| 2,095,041 | Thompson | Oct. 5, 1937 |
| 2,139,597 | Martin | Dec. 6, 1938 |
| 2,174,415 | Curtis | Sept. 26, 1939 |
| 2,409,199 | Dunlop | Oct. 15, 1946 |